United States Patent [19]
Woodward, Jr.

[11] Patent Number: 6,166,463
[45] Date of Patent: Dec. 26, 2000

[54] AXIAL FORCE ELECTRICAL MACHINES

[76] Inventor: Richard C. Woodward, Jr., 1119 Oakdale, Fullerton, Calif. 92831

[21] Appl. No.: 09/198,965

[22] Filed: Nov. 25, 1998

[51] Int. Cl.$^7$ .................................................. H02K 15/00
[52] U.S. Cl. ...................... 310/67 R; 310/190; 310/191; 310/192; 310/195; 310/209
[58] Field of Search ................................... 310/42, 67 R, 310/179, 180, 190, 191, 192, 209, 254, 258, 259, 261, 265; 29/596, 598

[56] References Cited

U.S. PATENT DOCUMENTS

| | | | |
|---|---|---|---|
| 4,341,969 | 7/1982 | Sievert | 310/154 |
| 5,302,876 | 4/1994 | Iwamatsu et al. | 310/156 |
| 5,552,653 | 9/1996 | Nose | 310/263 |
| 5,783,890 | 7/1998 | Mulgrave | 310/156 |
| 5,834,874 | 11/1998 | Krueger et al. | |

*Primary Examiner*—Nestor Ramirez
*Assistant Examiner*—Tran N Nguyen
*Attorney, Agent, or Firm*—Cleveland R. Williams

[57] ABSTRACT

The present invention resides in a radial air gap machine with a serrated air gap that can minimize external axial forces. This is accomplished by controlling the relationship between the air gap surfaces in the stator and rotor sections. To control the relationship between the stator sections and the rotor section in a vertical motor a bushing with external and internal thread of opposite hand with the internal thread having a steeper helix angle is twisted into a bearing mount and over a motor shaft. Thus, a vertical hollow shaft motor with magnetic balance thrust is adjusted.

In axial air gap machines, the magnetic force produced in the air gaps can also be utilized to compensate for axial loads.

5 Claims, 3 Drawing Sheets

AXIAL FORCE ELECTRICAL MACHINES

BACKGROUND OF THE INVENTION

1. Field of the Invention

This invention resides in axial force electrical machines that produce an axial force by shifting the air gap relationship between stator and rotor sections, wherein an axial thrust is produced by offsetting the rotor section in respect to the stator section. The greater the offset, the greater the axial force produced.

One of the major electrical machines having a large axial thrust is the vertical hollow shaft motor used for pumping water. These vertical hollow shaft motors used for pumping liquids in industry, municipalities and agriculture often have large axial loads that cause problems with ball bearings and other load bearing units of the motor. Some of these units contain stacked angular contact ball bearings in tandem mountings. Others require large spherical roller thrust bearings often requiring water to cool oil contained in said machine.

The present axial air gap machines utilize the magnetic force produced in the air gaps to compensate for axial loads.

2. Description of the Prior Art

Numerous attempts have been made in the past to increase the efficiency and reduce the energy consumption of electric machines. It should be noted however, that vertical hollow shaft motors produce an axial thrust that is detrimental to ball bearings and other load bearing units contained in said motors.

U.S. Pat. No. 3,296,475 to Park relates to dynamo-electric machines, rotors therefor. The patent describes an axial air gap machine having a lower rotor resistance thereby reducing power losses in said machine.

U.S. Pat. No. 3,304,450 to Bask, Jr., et al., describes an axial air gap dynamo-electric machine, wherein said machine is brushless and contains a rotor spaced apart from a stator armature by an axial air gap. A rotor disc, as described above, has at least one of its sides juxtaposed to a stator core provided with an armature winding with a narrow axial air gap between the faces of the stator and of the rotor.

U.S. Patent to Mori, et al., discloses a method for producing a magnetic core for an electric rotating machine which has an axially spaced air gap as in the case of a disc-type rotating machine.

U.S. Pat. No. 4,207,487 to Beyersdorf describes a disc-type, dynamo-electric machine having two stator and one rotor, active air gaps between each stator and the rotor, two annular energizing windings in the stators, and two non-active or auxiliary air gaps formed in a smooth region between the stators and the rotor.

U.S. Pat. No. 5,093,596 to Hammer relates to a combined linear-rotary direct drive step motor which provide both linear and rotary motion over a predefined range, e.g., along a portion of the longitudinal axis of the rotor shaft. The rotor and stator of the rotary step motor are described as having teeth.

U.S. Pat. No. 5,177,932 to Scott discloses a disc-type machine having a plurality of alternating stator and/or rotor sections. The stator has micro-laminated stator teeth molded from cut steel particles, mounted on a large disc of composite fiber material which is the main structure component of each stator section.

U.S. Pat. No. 5,777,421 to Woodward Jr. teaches a disc-type electrical machine having enhanced efficiency and effectiveness. The machine comprises a housing unit, a stator connected to said housing unit, a shaft rotatably connected to the stator housing unit with rotation means. A rotor connected to the shaft wherein the stator surface area and the rotor surface area are serrated.

As can be seen from the foregoing, there is an ongoing research effort to build better and more efficient electrical machines. The present axial force electrical machine solves the problem of undesired axial forces produced in vertical hollow shaft motors by offsetting the rotor section in respect to the rotor section of said motor.

SUMMARY OF THE INVENTION

The present invention resides in an axial force electrical machine which comprises a rotor section attached to a shaft, a stator section assembled around the rotor section, wherein the stator section and rotor section have serrated surface areas which define an air gap between them; and means for offsetting the stator section in relation to the rotor section.

DETAIL DESCRIPTION OF THE INVENTION

This invention resides in a radial air gap machine with serrated air gap surfaces that can produce an axial force by shifting the air gap relation between the stator and rotor sections. The same effect can be produced in a machine with two axial air gap lengths that differ.

Figure 1:
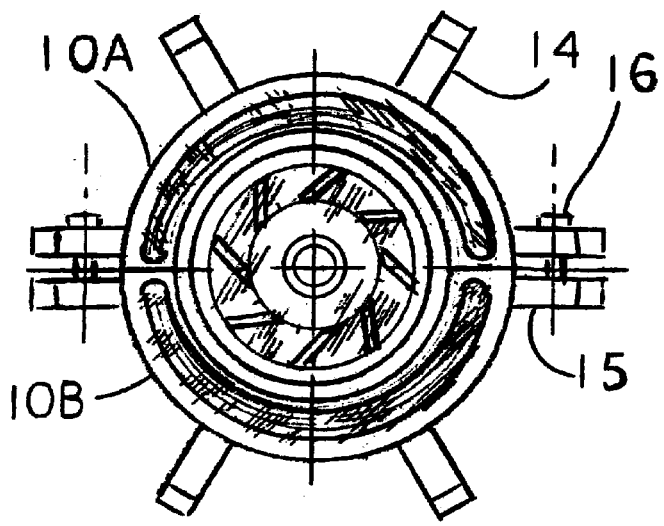
FIG. 1 is an end view of a stator section with stator ribs and a rotor section with a hollow shaft as shown in FIG. 2.
Figure 2:
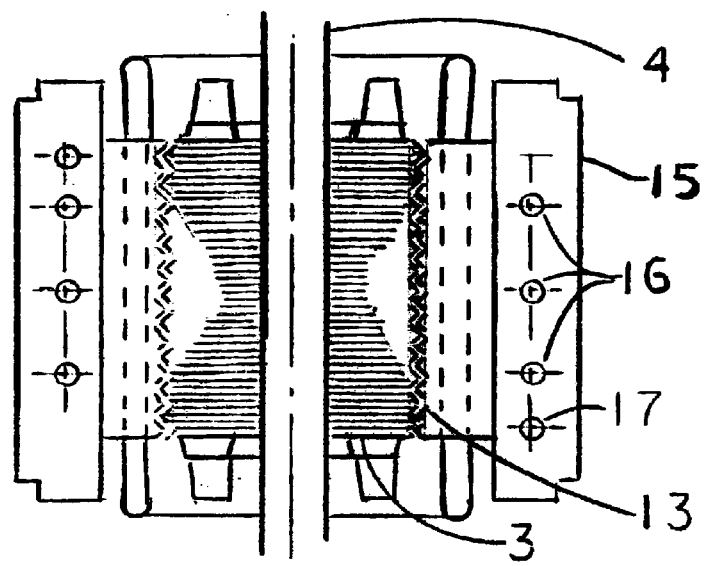
FIG. 2 is a cross-sectional drawing of a stator section and a rotor section.
Figure 5:
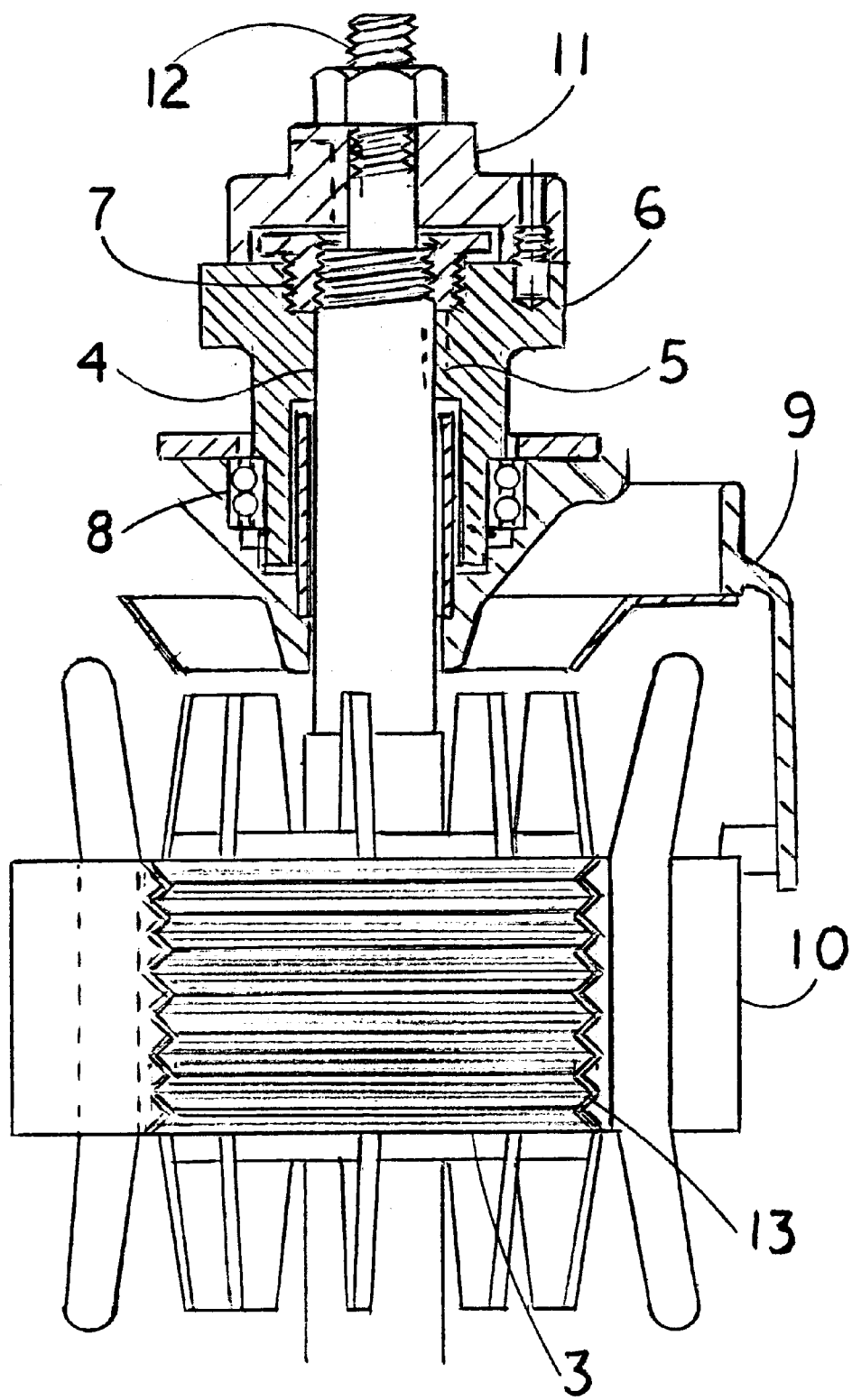
FIG. 5 is a partial cross-sectional assembly drawing of a vertical hollow shaft motor with a serrated air gap and a means to adjust the air gap axially.

FIG. 1 shows an end view of rotor and stator sections in FIG. 2 where stator sub-ribs 14 shown attached to stator section halves 10A and 10B with weld. It is to be noted that the stator 10 as shown in FIG. 5 below can contain from 2 to 50 stator sub-sections 10A, 10B, etc. as shown in FIG. 1. Stator clamping ribs 15 are also attached to and clamp stator section halves together and are fastened with cap screws 16 and located with dowel pins 17 shown in FIG. 2 where air gap 13 is between stator section halves and rotor core 3 containing hollow shaft 4.

Figure 3:
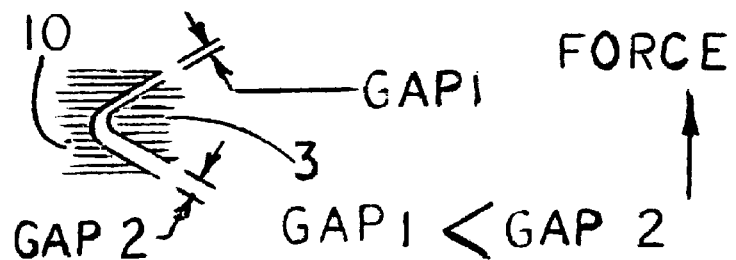
FIG. 3 is an enlarged sectional drawing of a serrated air gap axially shifted showing two gaps of different separating lengths.

FIG. 3 is an enlarged view of the air gap 13 shown in partial cross-section drawing FIG. 2 Air gap 1 is smaller than air gap 2 resulting in a magnetic pull between rotor core 3 and stator section halves 10A and 10B in the smaller air gap 1.

Figure 4:
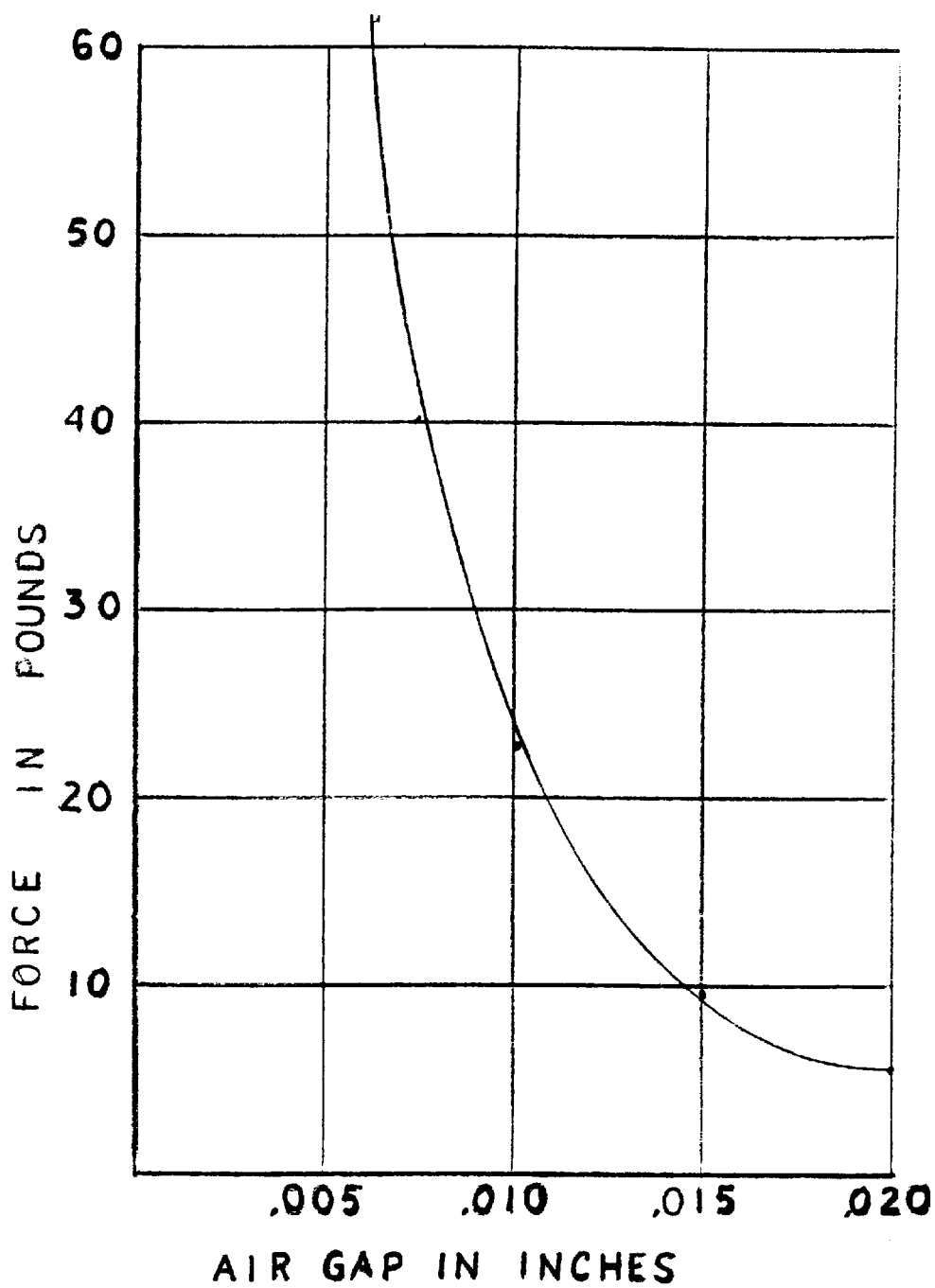
FIG. 4 is a graph of force VS air gap length.

FIG. 4 is a graph showing force VS air gap length which is directly related to the magnetic field strength in an air gap, based on force is inversely proportional to the square of the distance between and directly proportional to the field strength. By adjusting the air gap, an axial force is produced to offset undesirable axial thrust in motors.

FIG. 5 shows a partial cross-sectional assembly drawing of a vertical hollow shaft motor with a serrated air gap 13. Rotor core 3 contains a hollow shaft 4 with key 5 located between bearing mount 6 having internal thread at the upper end. By twisting bushing 7, with external and internal threads of opposite hand with the internal thread having a slightly steeper helix angle, the axial relation between rotor core 3 and stator section 10 can be changed altering the axial magnetic pull in the air gap 13 changing the axial force on bearing 8 a means of rotation between bearing mount 6 and upper bracket 9 which is attached to stator section 10. Bearing mount 6 is attached to and applies a torque to drive coupling 11 which drives pump shaft 12.

I claim:

1. An axial force electrical machine which comprises a rotor section attached to a shaft, a stator section assembled around the rotor section, wherein the stator section and rotor section have serrated surface areas which define an air gap between them; and means for offsetting the stator section in relation to the rotor section, wherein the means for offsetting the rotor section in relation to the stator section comprises a bushing with external and internal threads of opposite hand, with the internal thread having a slightly steeper helix angle and fits screwable over the threaded portion of a shaft attached to the rotor section, with the external thread of said bushing fitting in the threads of a bearing mount attached to a rotatable bearing fixed in an axial position to the stator section by means of a bracket.

2. The axial force electrical machine of claim 1, wherein the stator section contains from 2 to 50 stator sub-sections.

3. An axial force electrical machine which comprises a rotor section attached to a shaft, a stator section assembled around the rotor section, wherein the stator section and rotor section have serrated surface areas which define an air gap between them; and means for offsetting the stator section in relation to the rotor section, said air gap having two separate axial air gaps wherein the axial force in said machine is changed by different gap lengths between the two different air gaps.

4. The axial force electrical machine of claim 3, wherein the stator section contains from 2 to 50 stator subsections.

5. The axial force electrical machine of claim 3, wherein the means for offsetting the rotor section in relation to the stator section comprises a bushing with external and internal threads of opposite hand, with the internal thread having a slightly steeper helix angle and fits screwable over the threaded portion of a shaft attached to the rotor section, with the external thread of said bushing fitting in the threads of a bearing mount attached to a rotatable bearing fixed in an axial position to the stator section by means of a bracket.

* * * * *